United States Patent Office 3,230,951
Patented Jan. 25, 1966

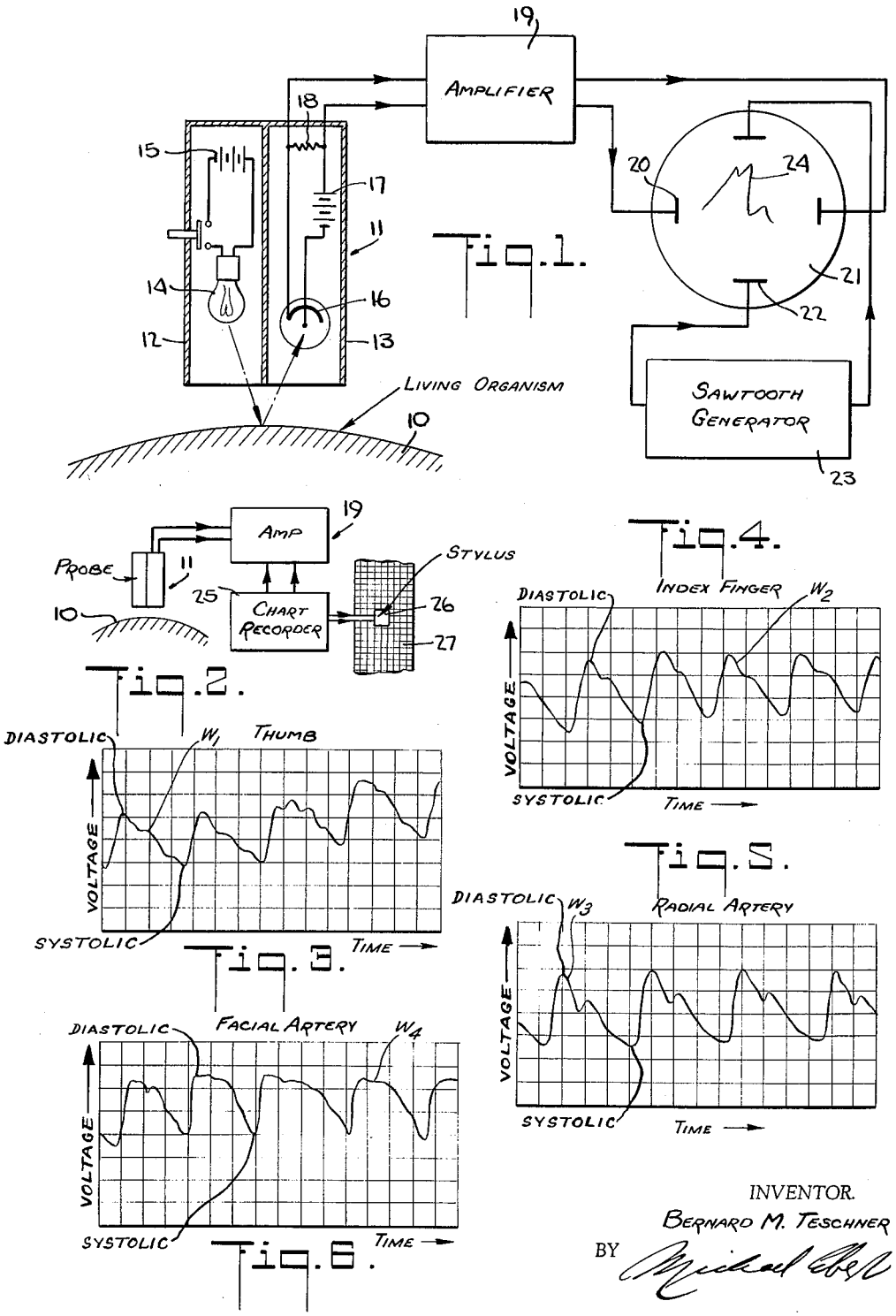

3,230,951
METHOD OF EXAMINING THE HEMODYNAMIC SYSTEM OF A HUMAN BODY
Bernard M. Teschner, Scarsdale, N.Y., assignor to Bulova Watch Company, Inc., New York, N.Y., a corporation of New York
Filed June 1, 1962, Ser. No. 199,494
3 Claims. (Cl. 128—2.05)

This invention relates generally to a method for automatically indicating or recording the pulse wave of a living organism, and more particularly to an instrument for carrying out this method and adapted to display the shape of the pulse wave as it is developed in different parts of the organism.

Instruments are known which detect the pulse beat of a living organism and count the pulse rate. Such pulse information is of physiological significance and useful for diagnostic purposes, but it is incomplete for it does not reveal the wave form or pattern of the individual pulses.

The circulatory system of the human body or of other living organisms is a highly complex network and the pulsatory action in different parts of the organism, as reflected in the pulse wave, is indicative of pathological conditions which may be restricted to such parts or areas. Thus the slope of the ascending limb or leading edge of the wave is a function of the duration of the ventricular discharge, the cardiac output, the height of the diastolic pressure, and the distensibility of the peripheral circulatory system.

The existence of dicrotism is indicated when the wave shape takes the form of a double pulse beat to each systole of the heart. The depth of prominence of the dicrotic notch is easily evident and indicates an insufficient blood supply in the peripheral circulatory system and a low diastolic pressure. On the other hand, the slope of the descending curve or trailing edge of the pulse form reflects the height of the diastolic pressure.

The character of the pulse wave may in a sense be derived from electrocardiographic information based on electric currents generated by the action of the heart. However, cardiographic devices are complex in design and require the application of electrodes to the body. Another approach to this problem involves the use of ballistocardiographic instruments making use of pressure-responsive transducers or other devices sensitive to the physical displacement or body recoil resulting from pulsatory activity. Such instruments are also complicated and relatively difficult to use.

Accordingly, it is the main object of the present invention to provide a method of examining the hemodynamic system of a living organism, the method being carried out by an instrument adapted automatically to record or display the peripheral pulse wave of the living organism.

More specifically, it is an object of the invention to provide an instrument including a probe which is adapted optically to sense changes in blood volume caused by the heart during systolic and diastolic rhythm to produce an electrical output which is a function of the hemodynamic system. The nature of the probe is such that readings may readily be taken at different points to produce pulse wave differences which may be indicative of disease processes restricted to parts of the organism.

Also an object of the invention is to provide an instrument for determining the wave shape of a living pulse, which operates reliably and efficiently, and which may be manufactured and sold at relatively low cost.

Yet another object of the invention is to provide a probe which may be applied to the skin of a living organism to produce an electrical output representative of the pulse wave, the output being applicable to existing chart recording devices incorporated in electrocardiographic installations and the like, to produce a record of the pulse wave.

Briefly stated, these objects are accomplished by a probe having a light source adapted to project a beam on a limited peripheral area of a living organism and a light-sensitive detector to pick up light reflected from the same area, the intensity of the reflected light varying in proportion to the light absorption of the expanding and contracting blood volume in the peripheral circulation. The detector produces a pulsatory electrical output which varies as a function of the varying light impinging thereon, this voltage being amplified, displayed or recorded.

For a better understanding of the invention, as well as other objects and further features thereof, reference is made to the following detailed description to be read in conjunction with the accompanying drawing, wherein:

FIG. 1 is a schematic diagram of a pulse wave detecting system in accordance with the invention;

FIG. 2 is a block diagram showing another embodiment of the invention; and

FIGS. 3 to 6 show typical wave form readings obtained with the device of FIG. 2.

Before considering the invention, it may be helpful to briefly summarize the manner in which blood circulates in a human organism. The heart operates to pump fresh blood into the arteries which supply the organs of the body, the rhythmic expansion or dilation of the heart being referred to as a diastolic action as opposed to systole or contraction.

All arteries become progressively smaller in diameter as they lead away from the heart, and at their terminations or arterials they connect with a network of fine blood vessels or capillaries, which extend to every tissue of the body. Through the walls of these capillaries there is a constant interchange of food and gases, and after this exchange has occurred, the blood returns to the lungs to be resupplied with oxygen before returning to the heart for recirculation. Each capillary network joins with a venule which as it enlarges becomes a full-sized vein. The blood emerging from the capillaries is at low pressure and as it enters the vein on its return to the lungs it is aided by additional pressure, mainly produced by contraction of the skeletal muscles. The fresh blood pumped away from the heart is called arterial blood, and the returning blood, venous blood.

Referring now to FIG. 1, if we consider the area 10 as being a part of a living organism, it will be appreciated that during systolic and diastolic rhythm, there is a periodic change in blood volume. It is this change in volume which is detected optically by means of a probe generally designated by numeral 11, and constituted by a light-emitting tube 12 and a light-detecting tube 13. The light-emitting tube includes a light bulb 14, energized by a battery 15 through a suitable switch, the light being confined to and directed at the limited area 10 to illuminate the same. The amount of light reflected varies with the volume of blood within the illuminated area, the larger the blood volume the greater the absorption of light. The color of blood is, of course, such that the more blood in the area the greater the light absorption.

Within the light detector tube 13 is a photosensitive or photoelectric cell 16 connected in series with a battery 17 and an output resistor 18 to produce an output voltage which varies as a function of the reflected light impinging on the cell. The cell is shielded from the light source and responds only to the amount of light reflected back from the illuminated surface 10 of the organism.

The voltage wave developed across resistor 18 is applied through a suitable amplifier 19 to one set of deflection electrodes 20 in an oscilloscope 21, the other set of electrodes 22 having a saw-tooth timing or base voltage applied thereto from generator 23, whose frequency or timing rate is adjusted to correspond to the pulse rate. Thus established on the screen of the cathode ray oscilloscope tube 21 is a wave pattern 24 representing the form of the cardiac pulse wave.

The probe may be placed anywhere on the surface of the skin or over an arterial pulse. It can easily be moved from position to position, thus comparing the circulation of one extremity against the other, and comparing one individual against a normal. The pulse pattern 24 on the cathode ray screen may be photographed for record purposes.

Alternately, as shown in FIG. 2 the output of the probe 11 may be applied through amplifier 19 to a chart recorder 25 whose output is applied to a galvanometer-type stylus 26 operating in conjunction with a moving chart 27 to provide a permanent record of the pulse wave.

Referring now to FIGS. 3 to 6, there are shown typical wave forms obtained by the use of the probe in conjunction with a recorder of the type described in FIG. 2. The wave forms are those developed over a three-second interval, probe contact being made with different areas on the body of a living patient. FIG. 3 shows the wave form $W_1$ obtained on the thumb of the patient, while FIG. 4 shows the waveform $W_2$ developed on the index finger. It will be evident that while the pulse rate is the same, the wave form at these different positions is significantly different.

FIG. 5 shows the form of pulse wave $W_3$ during a three-second interval with the probe at the radial artery, while FIG. 6 shows the wave form $W_4$ when the probe is placed on the facial artery. Thus the pulse waves in different parts of the organism have distinctly different characteristics, and may be used to determine disease processes restricted to parts of the organism.

While I have shown preferred embodiments of the invention, it will be obvious that many changes and modifications may be made therein without departing from the essential spirit of the invention, as defined in the annexed claims.

What is claimed is:

1. The method of examining the hemodynamic system of a human body, comprising the steps of:
   (a) illuminating at each of a plurality of different positions on the body, a limited peripheral surface area thereof,
   (b) detecting at each of said positions only the light reflected from the illuminated area to produce a pulsatory voltage which varies in accordance with the expanding and contracting blood volume in the illuminated area, whereby the pulse rate of the voltage is the same at each of said positions, but the wave form of the voltage being different at each of said positions, and
   (c) displaying the wave form of the pulsatory voltages obtained at said positions to produce a pattern of wave forms indicative of the condition of said body.

2. The method as set forth in claim 1, wherein said wave forms are displayed oscillographically to produce forms which are immediately visible on a screen.

3. The method as set forth in claim 1, wherein said wave forms are graphically recorded on the moving chart of a pen recorder to provide a permanent record thereof.

References Cited by the Examiner

UNITED STATES PATENTS

| | | | |
|---|---|---|---|
| 2,540,163 | 2/1951 | Brosene | 128—2.05 |
| 2,821,188 | 1/1958 | Pigeon | 128—2.05 |
| 2,944,542 | 7/1960 | Barnett | 128—2.05 |
| 3,040,737 | 6/1962 | Kompelien | 128—2.05 |
| 3,051,165 | 8/1962 | Kompelien | 128—2.05 |
| 3,103,214 | 9/1963 | Smith | 128—2.05 |

RICHARD A. GAUDET, *Primary Examiner.*

JORDAN FRANKLIN, LOUIS R. PRINCE, *Examiners.*